(12) United States Patent
Gam

(10) Patent No.: US 8,362,139 B2
(45) Date of Patent: Jan. 29, 2013

(54) ELECTRODEPOSITABLE COMPOSITION

(75) Inventor: Allisa Gam, Troy, MI (US)

(73) Assignee: E I du Pont de Nemours and Company, Wilmington, DE (US)

( * ) Notice: Subject to any disclaimer, the term of this patent is extended or adjusted under 35 U.S.C. 154(b) by 460 days.

(21) Appl. No.: 12/680,206

(22) PCT Filed: Oct. 3, 2008

(86) PCT No.: PCT/US2008/078705
§ 371 (c)(1),
(2), (4) Date: Mar. 26, 2010

(87) PCT Pub. No.: WO2009/046270
PCT Pub. Date: Apr. 9, 2009

(65) Prior Publication Data
US 2011/0162973 A1  Jul. 7, 2011

Related U.S. Application Data

(60) Provisional application No. 60/997,822, filed on Oct. 6, 2007.

(51) Int. Cl.
*C08L 31/02* (2006.01)
(52) U.S. Cl. .................... 524/556; 525/330.2

(58) Field of Classification Search .................. 524/556; 525/330.2
See application file for complete search history.

(56) References Cited

U.S. PATENT DOCUMENTS

| | | | |
|---|---|---|---|
| 3,445,362 A * | 5/1969 | Chow et al. ............. | 428/411.1 |
| 3,816,289 A | 6/1974 | Landauer et al. | |
| 4,122,053 A | 10/1978 | Murphy et al. | |
| 4,371,583 A | 2/1983 | Nelson | |
| 4,569,865 A | 2/1986 | Placek | |
| 4,657,971 A * | 4/1987 | Shiraki et al. ............. | 525/57 |
| 6,146,704 A | 11/2000 | Brodt et al. | |
| 7,314,900 B2 | 1/2008 | Tazzia et al. | |
| 2006/0127681 A1 | 6/2006 | Domes et al. | |
| 2007/0015873 A1 | 1/2007 | Fenn | |
| 2007/0117916 A1 | 5/2007 | Anderson et al. | |
| 2009/0186231 A1 | 7/2009 | Pfistner et al. | |

* cited by examiner

*Primary Examiner* — Kishor Mayekar
(74) *Attorney, Agent, or Firm* — Brian J Myers

(57) ABSTRACT

The present disclosure relates to a coating composition that can be applied to a conductive substrate via an anodic electrodeposition process, a substrate coated with the coating composition and a process for applying the coating to a substrate. The coating composition comprises an aqueous dispersion of at least partially neutralized copolymer comprising α-olefin and unsaturated carboxylic acid. After a layer of the coating has been applied to the substrate, it can be heated to cure the coating and form a crosslinked network that provides a durable chip and corrosion resistant finish.

7 Claims, No Drawings

ELECTRODEPOSITABLE COMPOSITION

This application claims priority from the provisional patent application Ser. No. 60/997,822, filed on Oct. 6, 2007.

FIELD OF THE DISCLOSURE

This disclosure relates to a composition comprising an aqueous dispersion of an at least partially neutralized copolymer of an α-olefin and unsaturated carboxylic acid that can be electrodeposited onto a conductive substrate. The applied coating composition can then be cured at elevated temperatures to form a crosslinked coating that helps the substrate to resist corrosion and provides an extremely durable chip resistant coating.

BACKGROUND OF THE DISCLOSURE

The coating of electrically conductive substrates by an electrodeposition process, also called an electrocoating process, is a well-known and important industrial process. Electrodeposition of primers on metal automotive substrates is widely used in the automotive industry. In this process, a conductive article, such as an autobody or an auto part, is immersed in a bath of an aqueous emulsion of film forming polymer and the article acts as an electrode in the electrodeposition process. An electric current is passed between the article and a counter-electrode in electrical contact with the coating composition until a coating is deposited on the article. In a cathodic electrocoating process, the article to be coated is the cathode and the counter-electrode is the anode. In an anodic electrocoating process, the article to be coated is the anode and the counter-electrode is the cathode.

Film forming resin compositions used in the bath of a typical cathodic electrodeposition process also are well known in the art and have been in use since the 1970's. These resins typically are made from polyepoxide resins that have been chain extended with an amine compound(s). The epoxy amine adduct is then neutralized with an acid compound to form a water soluble or water dispersible resin. These resins are blended with a crosslinking agent, usually a polyisocyanate, and dispersed in water to form a water emulsion which is usually referred to as a principal emulsion.

The principal emulsion is combined with a pigment paste, coalescent solvents, water, and other additives such as film build additives, pinhole additives and anti-crater agents to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics of the tank, the immersion time, and the like.

Anodic electrocoat compositions, while known, account for only a small percentage of the electrocoating industry. The first automotive electrocoat systems were anodic but were plagued by inadequate corrosion resistance, staining of the cured film and sensitivity to the substrate. The anodic electrocoat compositions were largely replaced in the mid-1970's by cathodic electrocoatings.

Compared with cathodic electrodeposition, articles coated with known anodic electrodeposition compositions typically have poor corrosion resistance, poor chip resistance, and poor flexibility. While cathodic coatings are more widely used than anodic electrodeposition coatings, cathodic electrodeposition coatings still suffer from problems, such as having limited UV stability, poor resistance to deformation, poor resistance to chipping, i.e., resistance to impacts from stones or other materials that may contact a substrate coated with at least a layer of electrodeposited coating.

There remains a need for electrodeposition coatings that have improved UV resistance, better resistance to deformation and have improved chip resistance.

SUMMARY OF THE DISCLOSURE

The present disclosure relates to electrodepositable composition which is an aqueous dispersion comprising:
i) an at least partially neutralized copolymer of an α-olefin and unsaturated carboxylic acid, which is the reaction product of a neutralizing agent with a copolymer of an α-olefin and unsaturated carboxylic acid;
ii) a film build additive; and
iii) a curing agent.

DETAILED DESCRIPTION

The present disclosure describes an electrodepositable coating composition, articles comprising a layer of the coating composition, and a process for preparing said articles. The electrodepositable composition comprises an aqueous dispersion, wherein the aqueous dispersion comprises an at least partially neutralized copolymer of α-olefin and unsaturated carboxylic acid; a film build additive; and a curing agent. The copolymer of α-olefin and unsaturated carboxylic acid is a copolymer that is polymerized from a monomer mixture that comprises both α-olefin such as, for example, ethylene, and α,β-unsaturated carboxylic acid monomer such as, for example, (meth)acrylic acid. The copolymer can be neutralized with an inorganic base, an organic base or a combination thereof to form the at least partially neutralized copolymer of α-olefin and unsaturated carboxylic acid. The electrodepositable compositions are particularly useful for forming a dried and cured layer of film on a conductive substrate.

As used herein, the term "(meth)acrylic" is used to denote one or both of an acrylic moiety or a methacrylic moiety. For example, the term (meth)acrylic acid means acrylic acid and/or methacrylic acid.

The term "(meth)acrylate" means one or both of an acrylate moiety or a methacrylate moiety. For example, the term methyl (meth)acrylate means methyl acrylate and/or methyl methacrylate.

As used herein, the term "aqueous dispersion" means a liquid system in which solid particles are dispersed in water. The dispersing agent for the disclosed coating composition is water, however, small amounts of volatile organic solvents may be present.

The phrases "copolymer of α-olefin and unsaturated carboxylic acid", "acid copolymer", and "copolymer comprising α-olefin and unsaturated carboxylic acid" are used interchangeably and mean a copolymer that is polymerized from a monomer mixture comprising at least one α-olefin monomer such as, for example, ethylene, and at least one unsaturated carboxylic acid monomer such as, for example, (meth)acrylic acid according to known copolymerization methods.

The phrase "at least partially neutralized" copolymer for the purposes of the present invention includes a continuous range of acid neutralized compositions wherein at least 30 percent of the acid groups of a copolymer comprising carboxylic acid functionality have been reacted with a base—said base being selected from an inorganic base, an organic base or a combination thereof—to form the salt of the acid copolymer. The above phrase should also be understood in the present invention to include examples wherein an excess of base is used to neutralize all or substantially all of the carboxylic acid groups of the acid copolymer.

Melt Index, as used herein, is determined in accordance with ASTM D1238 at 190° C. and 2.16 kg, and the values reported herein have units of grams/10 minutes.

The features and advantages of the present disclosure will be more readily understood, by those of ordinary skill in the art, from reading the following detailed description. It is to be appreciated that certain embodiments, which are, for clarity, described above and below in the context of separate embodiments, may also be provided in combination in a single embodiment. Conversely, various features that are, for brevity, described in the context of a single embodiment, may also be provided separately or in any sub-combination.

Also, use of "a" or "an" are employed to describe elements and components described herein. This is done merely for convenience and to give a general sense of the scope of the disclosure. This description should be read to include one or at least one and the singular also includes the plural unless the context specifically states otherwise.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including every value between the minimum and maximum values.

In the foregoing description, the concepts have been described with reference to specific embodiments. However, one of ordinary skill in the art would appreciate that various modifications and changes can be made without departing from the scope of the disclosure as set forth in the claims below. Accordingly, the specification is to be regarded in an illustrative rather than a restrictive sense, and all such modifications are intended to be included within the scope of disclosure.

Electrodepositable Composition

In one embodiment, the electrodepositable composition is an aqueous dispersion comprising: i) an at least partially neutralized copolymer of α-olefin and unsaturated carboxylic acid; ii) a film build additive; and iii) a curing agent.

In another embodiment, the electrodepositable composition is an aqueous dispersion comprising: i) an at least partially neutralized copolymer of α-olefin and unsaturated carboxylic acid; ii) a film build additive; iii) a curing agent; and iv) a surfactant.

In another embodiment, the electrodepositable composition is an aqueous dispersion consisting essentially of: i) an at least partially neutralized copolymer of α-olefin and unsaturated carboxylic acid; ii) a film build additive; and iii) a curing agent.

In still another embodiment, the electrodepositable composition comprises an aqueous dispersion, wherein the aqueous dispersion consists essentially of: i) an at least partially neutralized copolymer of α-olefin and unsaturated carboxylic acid; ii) a film build additive; iii) a curing agent, and iv) a surfactant.

In the above embodiments, the at least partially neutralized copolymer of α-olefin and unsaturated carboxylic acid is the reaction product of a neutralizing agent with a copolymer of α-olefin and unsaturated carboxylic acid.

Copolymer Comprising Ethylene and (Meth)Acrylic Acid

An acid copolymer of the present invention can be polymerized from a monomer mixture comprising α-olefin and unsaturated carboxylic acid monomers. Suitable α-olefins can have the formula $R(R^1)C=CH_2$, wherein R and $R^1$ are each independently chosen from hydrogen or an alkyl radical having in the range of from 1 to 8 carbon atoms. In some embodiments, the α-olefins can be chosen from, for example, ethylene, propylene, 1-butene, isobutene, 1-pentene, 2-methyl-1-butene, 3-methyl-1-butene, 1-hexene, 2-methyl-1-hexene and a combination thereof.

The unsaturated carboxylic acid monomers can include α,β-ethylenically unsaturated carboxylic acids having in the range of from 3 to 8 carbon atoms. Suitable unsaturated carboxylic acids include, for example, acrylic acid, methacrylic acid, maleic acid, and maleic acid mono-esters (also referred to in the art as the "half-ester" of maleic acid). Other suitable carboxylic acid monomers include, for example, crotonic acid, itaconic acid, fumaric acid, haloacrylic acids such as chloroacrylic acid, citraconic acid, vinylacetic acid, pentenoic acids, alkyl (meth)acrylic acids, alkylcrotonic acids, alkenoic acids and combinations thereof.

In one embodiment, acrylic acid is the carboxylic acid monomer for use in polymerizing the copolymer comprising α-olefin and unsaturated carboxylic acid. In another embodiment, methacrylic acid is the unsaturated carboxylic acid monomer used to form the copolymer comprising α-olefin and unsaturated carboxylic acid. In a third embodiment, a combination of acrylic acid and methacrylic acid are the unsaturated carboxylic acid monomers used in polymerizing the copolymer comprising α-olefin and unsaturated carboxylic acid.

The copolymer comprising α-olefin and unsaturated carboxylic acid can be a random copolymer formed from ethylene with acrylic acid and/or methacrylic acid, and can optionally comprise one or more additional monomers. The additional monomers can include, for example, one or more of alkyl (meth)acrylates wherein the alkyl groups have from about 1 to about 8 carbon atoms; styrene or substituted styrene; (meth)acrylonitrile; vinyl acetates; vinyl ethers; and combinations thereof. The additional monomers can be used in the range of from 0 to 40 percent by weight, based on the total weight of the monomers in the copolymer comprising α-olefin and unsaturated carboxylic acid.

Examples of copolymers suitable for use include copolymers such as, for example: ethylene/(meth)acrylic acid/n-butyl(meth)acrylate; ethylene/(meth)acrylic acid/iso-butyl (meth)acrylate; ethylene/(meth)acrylic acid/methyl(meth) acrylate; ethylene/(meth)acrylic acid/ethyl(meth)acrylate; and a combination thereof.

Suitable copolymers useful in the practice of the present invention can be linear, branched, or graft copolymers. The process for producing these polymers is well-known in the art and will not be described herein. Suitable examples of the copolymers of α-olefin and unsaturated carboxylic acid are commercially available and include, for example, NUCREL® acid copolymer resins available from DuPont, Wilmington, Del.

In some embodiments, the copolymer of α-olefin and unsaturated carboxylic acid can have a carboxylic acid containing monomer content in the range of from 5 to 25 percent by weight based on the total weight of all of the monomers that make up the copolymer. The copolymer of α-olefin and unsaturated carboxylic acid can have a melt index in the range of from 10 to 1000.

In other embodiments, the melt index of the copolymer of α-olefin and unsaturated carboxylic acid is in the range of from 50 to 800, in other embodiments, the melt index is in the range of from 100 to 500, and in further embodiments, the melt index is in the range of from 200 to 450. In one embodiment, the copolymer of α-olefin and unsaturated carboxylic acid is a NUCREL® acid copolymer resin which has a melt index of about 300 and a (meth)acrylic acid monomer content of about 20 percent. In another embodiment, the copolymer of α-olefin and unsaturated carboxylic acid is a NUCREL® acid copolymer resin which has a melt index of about 400 and a (meth)acrylic acid monomer content of about 19 percent.

The acid copolymer can be present in the electrodepositable composition in the range of from 55 to 90 percent by weight, based on the total solids content. As used herein, the term "total solids" content means the total weight of all ingredients that are present in the electrodepositable composition, excluding water and other small amounts of volatile organic solvent that may be present.

In some embodiments, the acid copolymer can be present in the electrodepositable composition in the range of from 55 to 85 percent by weight, based on the total solids content.

In further embodiments, the copolymer of α-olefin and unsaturated carboxylic acid can be present in the electrodepositable composition in the range of from 60 to 80 percent by weight, based on the total solids content.

Neutralizing Agent

A neutralizing agent (that is, a base) is added to neutralize at least a portion of the carboxylic acid groups of the copolymer comprising α-olefin and unsaturated carboxylic acid. The neutralizing agent can be any base that is capable of reacting with an acid copolymer to form a salt of the acid. The base can be selected from the group consisting of an organic base, an inorganic base and combinations thereof. Inorganic bases include, for example, metal hydroxides such as, for example, potassium hydroxide, sodium hydroxide, calcium hydroxide, magnesium hydroxide. Organic bases include ammonia, primary amines, secondary amines, tertiary amines, hydrazine, mono-, di-, tri- or tetra-alkylhydrazines. Combinations of any of the above listed neutralizing agents are suitable. Acid-base chemistry is well-known to one of ordinary skill in the art, and therefore the use of other bases not specifically recited herein should not be considered novel and should not be considered outside the intended scope of the present invention.

In some embodiments, the neutralizing agent is potassium hydroxide, sodium hydroxide or a combination thereof. In other embodiments, the neutralizing agent can be an amine of the formula;

$N(R^2)_3$ wherein each $R^2$ is independently selected from the group consisting of H, $CH_3$, $CH_2CH_3$, $CH_2CH_2CH_3$, $CH(CH_3)_2$, $CH_2OH$, $CH_2CH_2OH$, $CH_2CH_2CH_2OH$, $CH_2CH(OH)CH_3$, $CH(CH_3)CH_2OH$ and $CH(OH)CH_2CH_3$. In some embodiments, the neutralizing agent can be selected from the group consisting of ethanolamine, N-methylethanolamine, N-ethylethanolamine, N,N-dimethylethanolamine, dimethylamine, diethylamine, diisopropylamine, dipropylamine, trimethylamine, triethylamine and a combination thereof.

Film Build Additive

The term "film build additive" as used herein is an additive that is required to provide a layer of the electrodeposited composition having a thickness in the range of from 12 microns to 50 microns.

The film build additive can be a long chain alkyl amine. The long chain alkyl amine is described by the generic formula:

$N(R^3)(R^4)(R^5)$ wherein $R^3$ and $R^4$ are each independently hydrogen or alkyl groups selected from: —$CH_3$, —$CH_2CH_3$, —$CH_2CH_2CH_3$, —$CH(CH_3)_2$, or $C_3$-$C_{20}$ linear, branched or cyclic alkyl groups; or wherein $R^3$ and $R^4$ may be taken together to form a ring having at least 4 carbon atoms; and wherein $R^5$ is a $C_4$-$C_{20}$ linear, branched or cyclic alkyl group.

Suitable long chain alkyl amines include, for example, dodecylamine, N-methyldodecylamine, N-ethyldodecylamine, N,N-dimethyldodecylamine, N,N-diethyldodecylamine, octadecylamine, N-methyloctadecylamine, N-ethyloctadecylamine, N,N-dimethyloctadecylamine, N,N-diethyloctadecylamine, cyclohexylamine, N-methylcyclohexylamine, N-ethylcyclohexylamine, N,N-dimethylcyclohexylamine, N,N-diethylcyclohexylamine, N,N-didecylamine, N,N-didecylethylamine, N,N-didecylmethylamine, and a combination thereof.

Since the film build additive is an amine functional compound, it is capable of neutralizing the carboxylic acid groups in the copolymer of α-olefin and unsaturated carboxylic acid. In some embodiments of the present disclosure, the combination of neutralizing agent and film build additive can be present in an amount that is theoretically capable of neutralizing greater than or equal to 30 percent of the carboxylic acid groups of the copolymer of α-olefin and unsaturated carboxylic acid. In other embodiments, the combination of neutralizing agent and film build additive can be present in an amount that is theoretically capable of neutralizing in the range of from 30 to 150 percent of the carboxylic acid groups of the copolymer of α-olefin and unsaturated carboxylic acid.

The ratio of neutralizing agent to film build additive can be in the range of from 1:99 to 99:1. In some embodiment, the ratio of neutralizing agent to film build additive can be in the range of from 10:90 to 90:10. In other embodiments, the ratio of neutralizing agent to film build additive can be in the range of from 20:80 to 80:20. In further embodiments, the ratio of neutralizing agent to film build additive can be in the range of from 30:70 to 70:30. All ratios are weight ratios of the neutralizing agent to the film build additive.

Curing Agent

A peroxide curing agent can be added to the electrodepositable composition to provide a crosslinked coating upon curing. Suitable peroxides include organic and inorganic peroxide compounds. In one embodiment, the curing agent can be a metal peroxide such as, for example, zinc peroxide. In other embodiments, suitable metal peroxides can be selected from the group consisting of magnesium peroxide, barium peroxide, strontium peroxide, cadmium peroxide, titanium peroxide and a combination thereof.

In some embodiments, the curing agent can be present in the electrodepositable composition in the range of from 5 to 30 percent by weight based on the total solids. In other embodiments, the curing agent can be present in the electrodepositable composition in the range of from 5.5 to 20 percent by weight based on the total solids. In still other embodiments, the curing agent can be present in the electrodepositable composition in the range of from 6 to 10 percent by weight based on the total solids.

Additives

Other additives are optional and can be mixed with the electrodepositable composition, if desirable, and depending upon the effect of the additive. Optional additives can include, for example, surfactants, pigments, light stabilizers, anti-crater agents, flow aids, dispersion stabilizers and fillers.

Examples of surfactants include alkoxylated styrenated phenols, such as, for example, SYNFAC® 8334, available from Milliken Chemical Company, Spartanburg, S.C.; alkyl imidazoline surfactants such as those available from Huntsman, Woodlands, Tex.; and nonionic surfactants such as, for example, SURFYNOL® surfactants, available from Air Products, Allentown, Pa. Combinations thereof can also be used.

Examples of pigments include, for example, titanium dioxide, ferric oxide, red iron oxide, transparent red iron oxide, black iron oxide, brown iron oxide, chromium oxide green, carbon black, aluminum silicate, precipitated barium sulfate and a combination thereof. In one embodiment, the electrodepositable coating contains pigments. In another embodiment, the electrodepositable composition contains no pigments.

Light stabilizers, such as, for example, hindered amine light stabilizers can be added to the electrodepositable composition. Representative commercially available hindered amine light stabilizers can be, for example, TINUVIN® 770, 292 and 440 which are sold by Ciba-Geigy Corporation.

Flow additives include materials such as, for example, ethylene and/or propylene adducts of nonyl phenols or bisphenols.

Formation of the Electrodepositable Composition

In one embodiment, the electrodepositable composition is formed by combining water, an acid copolymer as described herein, neutralizing agent and film build additive to form a mixture, which is stirred and (optionally) heated until the copolymer is dispersed. If the mixture is heated to obtain a dispersed copolymer, it can be cooled to ambient temperature and the curing agent along with any optional additives can be added. The mixture can then be further agitated and/or milled to disperse the curing agent and any optional additives. In one embodiment, the electrodepositable composition can be further diluted with water to obtain a total solids content in the range of from 10 to 25 percent by weight.

An electrodepositable composition formed in this manner typically will have particle sizes in the range of from 30 to 170 nanometers and a pH in the range of from 7 to 11.

Process for Coating a Substrate

In one embodiment, a substrate is coated via a process comprising:

A) providing a bath of an anodic electrodepositable composition comprising an aqueous dispersion comprising: i) an at least partially neutralized copolymer of α-olefin and unsaturated carboxylic acid; ii) a film build additive; and iii) a curing agent;

B) immersing the substrate in said anodic electrodepositable composition;

C) applying a voltage between a cathode and said substrate, which serves as an anode;

D) removing the substrate from the bath; and

E) heating the applied layer of electrodeposited composition.

Optionally, the process further comprises rinsing the substrate prior to E), heating the applied layer of electrodeposited composition. Rinsing, if included, is typically done using water or deionized water.

In one embodiment, the process includes immersing the substrate at least partially in the electrodepositable composition. In a second embodiment, the entire substrate is immersed in the electrodepositable composition.

In some embodiments, the electrodepositable composition is applied at a bath temperature in the range of from 25° C. to about 40° C., the applied voltage can range from 100 to 400 volts and the electric current can be applied in the range of from 1 second to 5 minutes. In another embodiment, the electric current can be applied in the range of from about 20 seconds to about 5 minutes.

The applied layer of electrodeposited composition can be heated at a temperature in the range of from 150° C. to 250° C. to dry and cure the applied layer of electrodeposited composition to produce a dried and crosslinked layer of film. In one embodiment, the thickness of a layer of the dried and crosslinked electrodepositable composition is in the range of from 12 microns to 50 microns. In another embodiment, the thickness of a layer of the dried and crosslinked electrodepositable composition is in the range of from 15 to 45 microns.

The substrate optionally can be cleaned to remove grease, dirt, or other extraneous material prior to coating with a layer of the electrodepositable composition. This is typically done by employing conventional cleaning procedures and materials. Suitable cleaning materials include for example, organic solvents such as, ketones, ethers, acetates, and a combination thereof; mild or strong alkaline cleaners, such as those commercially available and conventionally used in metal treatment processes. Examples of alkaline cleaners include the P3® line of cleaners available from Henkel, Dusseldorf, Germany. Such cleaning steps are generally followed and/or preceded by water rinse(s). Optionally, the metal surface may be rinsed with or immersed in one or more aqueous acidic solutions after cleaning and before contact with the subsequent electrodepositable composition. Examples of rinse solutions include mild or strong acidic cleaners, such as dilute nitric acid solutions, which are commercially available and conventionally used in metal treatment processes.

Substrate and Uses

Useful substrates that can be coated with the electrodepositable composition include electrically conductive substrates such as, for example, metallic materials, for example ferrous metals such as iron, steel, and alloys thereof, non-ferrous metals such as aluminum, zinc, magnesium and alloys thereof, and a combination thereof. In some embodiments, the substrate is cold-rolled steel, zinc-coated steel, aluminum or magnesium. Thermoplastic and thermoset articles that are electrically conductive or that have been rendered electrically conductive by, for example, the addition of an electrically conductive coating can also be coated with the disclosed electrodepositable composition.

The coated substrates can be used as components to fabricate automotive vehicles, automobile bodies, any and all items manufactured and painted, such as, for example, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, boats, and aircraft. The substrate further includes industrial and commercial new construction and maintenance thereof; walls of commercial and residential structures, such office buildings and homes; amusement park equipment; marine surfaces; outdoor structures, such as bridges, towers; coil coating; railroad cars; machinery; OEM tools; signage; sporting goods; and sporting equipment. The substrates can have any shape, for example, in the form of automotive body components, such as bodies (frames), hoods, doors, fenders, bumpers and/or trim, for automotive vehicles.

The substrate that is coated with a dried and cured layer of the electrodepositable composition can be used as is or additional layers of coating compositions can be applied. In the manufacture of automobiles and other consumer goods, the applied coating can be further coated with one or more of commercially available primers, primer surfacers, sealers, basecoat compositions, clearcoat compositions, glossy topcoat compositions and any combination thereof.

EXAMPLES

Unless otherwise specified, all ingredients are available from the Aldrich Chemical Company, Milwaukee, Wis.

NUCREL® acid copolymer resins are available from DuPont, Wilmington, Del.

SYNFAC® 8334 is available from the Milliken Chemical Company, Spartanburg, S.C.

SURFYNOL® 104BC is available from Air Products, Allentown, Pa.

Test Procedures

To test the methyl ethyl ketone solvent resistance, the layer of dried and cured composition on each panel was rubbed with a cloth saturated with methyl ethyl ketone 100 times and any excess methyl ethyl ketone was wiped off. The panel was visually rated from 1-10. A rating of 10 means no visible damage to the coating, 9 means 1 to 3 distinct scratches, 8 means 4 to 6 distinct scratches, 7 means 7 to 10 distinct scratches, 6 means 10 to 15 distinct scratches with slight pitting or slight loss of color, 5 means 15 to 20 distinct scratches with slight to moderate pitting or moderate loss of color, 4 means scratches start to blend into one another, 3 means only a few undamaged areas between blended scratches, 2 means no visible signs of undamaged paint, 1 means complete failure i.e., bare spots are shown.

Film Smoothness is rated visually by an application expert.

10-day salt spray was tested according to ASTM B117

Particle size was measured using a NANOTRAC® dynamic light scattering particle size analyzer, available from Microtrac, Montgomeryville, Pa.

Preparation of Dispersions 1-6

All ingredients listed in the following examples and Tables are expressed in parts by weight.

The ingredients of portion 1 of TABLE 1 were added to a suitable mixing vessel under agitation and a nitrogen atmosphere. The mixture was heated to 88° C. and stirred until the pellet form of the NUCREL® was well dispersed in water. The mixture was cooled to about 32° C. and the ingredients of Portion 2 of TABLE 1 were added to the mixing vessel and the mixture was milled for 6 to 8 hours on a roller mill. The mixture was diluted with portion 3 of TABLE 1.

TABLE 1

| Ingredient | DISPERSION | | | | | |
|---|---|---|---|---|---|---|
| | 1 | 2 | 3 | 4 | 5 | 6 |
| Portion 1 | | | | | | |
| NUCREL ®[1] | 380 | 380 | 380 | 380 | 380 | 380 |
| Water | 1463 | 1463 | 1806 | 1739 | 1679 | 1456 |
| N,N-dimethyl ethanolamine | 40 | 40 | 40 | 40 | 40 | 0 |
| Potassium Hydroxide | 0 | 0 | 0 | 0 | 0 | 55 |
| N,N-dimethyl octadecylamine | 89 | 89 | 0 | 0 | 0 | 0 |
| N,N-dimethyl dodecylamine | 32 | 32 | 0 | 0 | 0 | 85 |
| N,N-dimethyl cyclohexylamine | 0 | 0 | 64 | 0 | 0 | 0 |
| N,N-didecyl methylamine | 0 | 0 | 0 | 156 | 0 | 0 |
| Trioctylamine | 0 | 0 | 0 | 0 | 170 | 0 |
| Portion 2 | | | | | | |
| Zinc Peroxide | 49 | 49 | 49 | 49 | 49 | 49 |
| SYNFAC ® 8334 | 0 | 11 | 0 | 0 | 0 | 0 |
| SURFYNOL ® 104BC | 0 | 2 | 0 | 0 | 0 | 0 |
| Aluminum Silicate | 0 | 32 | 0 | 0 | 0 | 0 |
| Portion 3 | | | | | | |
| Water | 1631 | 1800 | 1040 | 1591 | 1370 | 1428 |

[1] NUCREL ® acid copolymer resin, with about 20% methacrylic acid and a melt index of about 300.

Preparation of Dispersion A-I (Comparative Examples)

The following examples show dispersions that lack the curing agent.

The ingredients of Portion 1 of Table 2 were charged into a suitable mixing vessel under agitation and a nitrogen atmosphere. The mixture was heated to 88° C. and stirred until the pellet form of the NUCREL® was well dispersed in water. The mixture was cooled to about 32° C. and the mixture was diluted with portion 2 of Table 2.

TABLE 2

| Ingredients | Dispersion | | | | | | | | |
|---|---|---|---|---|---|---|---|---|---|
| | A | B | C | D | E | F | G | H | I |
| Portion 1 | | | | | | | | | |
| NUCREL ®[1] | 380 | 380 | 380 | 380 | 380 | 380 | 0 | 0 | 0 |
| NUCREL ®[2] | 0 | 0 | 0 | 0 | 0 | 0 | 453 | 453 | 453 |
| Water | 1134 | 1366 | 1457 | 1463 | 1456 | 1465 | 1933 | 2238 | 1456 |
| N,N-dimethyl ethanolamine | 40 | 40 | 40 | 40 | 0 | 0 | 0 | 142 | 89 |
| Potassium Hydroxide | 0 | 0 | 0 | 0 | 55 | 0 | 200 | 0 | 0 |
| Triethanol amine | 0 | 0 | 0 | 0 | 0 | 59 | 0 | 0 | 0 |
| N,N-dimethyl dodecylamine | 0 | 85 | 0 | 32 | 0 | 0 | 0 | 0 | 119 |
| N,N-dimethyl octadecylamine | 0 | 0 | 119 | 89 | 0 | 0 | 0 | 0 | 0 |
| Portion 2 | | | | | | | | | |
| Water | 1069 | 1286 | 1371 | 1377 | 828 | 815 | 808 | 886 | 2487 |

[1] NUCREL ® acid copolymer resin, with about 20% methacrylic acid and a melt index of about 300
[2] NUCREL ® acid copolymer resin, with about 19% methacrylic acid and a melt index of about 400.

Preparation of Cold-Rolled Steel Panels

Cold-rolled steel panels were cleaned by wiping them with methyl isobutyl ketone. The panels were then dipped into 0.125% aqueous nitric acid solution at 27° C. for 4 minutes and then dipped into 0.25% zirconyl nitrate solution at 27° C. for 4 minutes. The panels were force dried in an oven at 100° C. for 5 minutes. The panels were cooled to room temperature and used as is.

Electrodeposition Procedure

The treated cold-rolled steel panels were anodically coated in dispersions 1 through 6 and comparative dispersions A through I at a bath temperature of 32° C. for 2 minutes at 240 volts. Each coated panels was washed with deionized water and baked at about 198° C. for 10 minutes. The panels were then tested for film thickness, methyl ethyl ketone solvent resistance, and 10-day salt spray corrosion test according to ASTM B117. The results of the test are given in Table 3.

TABLE 3

| | Results | | | |
|---|---|---|---|---|
| Dispersion | Film Thickness (mils) | Film Smoothness | Methyl ethyl ketone solvent resistance | 10-day Salt Spray |
| 1 | 1.0 | smooth | 10 | good |
| 2 | 1.0 | smooth | 10 | good |
| 3 | 0.6 | smooth | 10 | n/t |
| 4 | 0.9 | slightly rough | 10 | n/t |
| 5 | 0.9 | slightly rough | 10 | n/t |
| 6 | 0.7 | Smooth | 10 | n/t |
| A* | 0.1 | smooth | 1 | poor |
| B* | 0.8 | smooth | 1 | poor |
| C* | 1.2 | smooth | 1 | poor |
| D* | 1.0 | smooth | 1 | poor |
| E* | 0.1 | smooth | 1 | n/t |
| F* | 0.1 | smooth | 1 | n/t |
| G* | 0.4 | slightly rough | 2 | n/t |
| H* | 0.4 | slightly rough | 2 | n/t |
| I* | 0.6 | slightly rough | 2 | n/t |

*Comparative examples
n/t - not tested

The results show that the presence of the film build agent (examples 1 through 6 and comparative examples B, C, D and I) can increase the film thickness of the electrodeposited composition compared with example A, E and F having no film build additive. The presence of the curing agent significantly enhances the methyl ethyl ketone solvent resistance as shown in examples 1 through 6.

Cured coatings of dispersions 1 and 2 were further tested according to GM9540P accelerated corrosion test and GM9508P method B chip resistance test. For chip resistance test, one set of electrodeposited panels were then coated with DuPont solventborne primer, basecoat and clearcoat and another set of electrodeposited coated panels were then coated with waterborne primer, basecoat and clearcoat, according to the manufacturers instructions. The results of the test are shown in Table 4.

TABLE 4

| Dispersion | GM9540P Accelerated corrosion | GM9508P chip resistance (solventborne) | GM9508P chip resistance (waterborne) |
|---|---|---|---|
| 1 | 5 mm | 9 | 9 |
| 2 | 5 mm | 9 | 9 |

The results of these tests show that a substrate having a dried and crosslinked layer of the aforedescribed electrodepositable composition that is subsequently coated with commercially available coating compositions has excellent corrosion resistance and chipping resistance. For the purposes of these tests, an accelerated corrosion score of 6 mm or less is considered to pass the test and a chip resistance score of 7 or higher is considered to have passed.

What is claimed is:

1. An electrodepositable composition which is an aqueous dispersion comprising:
   i) an at least partially neutralized copolymer of an α-olefin and unsaturated carboxylic acid, which is the reaction product of a neutralizing agent with a copolymer of an α-olefin and unsaturated carboxylic acid;
   ii) a film build additive; and,
   iii) a curing agent,
   wherein the curing agent consists of zinc peroxide. magnesium peroxide, barium peroxide, strontium peroxide, cadmium peroxide, titanium peroxide or a combination thereof.

2. The electrodepositable composition of claim 1 wherein the copolymer is neutralized with a neutralizing agent selected from the group consisting of an inorganic base, an organic base and a combination thereof.

3. The electrodepositable composition of claim 1 wherein the neutralizing agent is $N(R^2)_3$, wherein each $R^2$ is independently selected from the group consisting of H, $CH_3$, $CH_2CH_3$, $CH_2CH_2CH_3$, $CH(CH_3)_2$, $CH_2OH$, $CH_2CH_2OH$, $CH_2CH_2CH2OH$, $CH_2CH(OH)CH_3$, $CH(CH_3)CH_2OH$ and $CH(OH)CH_2CH_3$; and the film build additive is $N(R^3)(R^4)(R^5)$, wherein $R^3$ and $R^4$ are each independently hydrogen or alkyl groups selected from the group consisting of: —$CH_3$, —$CH_2CH_3$, —$CH_2CH_2CH_3$, —$CH(CH_3)_2$, or C3-C20 linear, branched or cyclic alkyl groups; or wherein $R^3$ and $R^4$ may be taken together to form a ring having at least 4 carbon atoms; and wherein $R^5$ is a C4-C20 linear, branched or cyclic alkyl group.

4. The electrodepositable composition of claim 1 wherein: (a) the unsaturated carboxylic acid monomer is incorporated into the copolymer such that from 5 to 25 percent of the copolymer, by weight, is derived from the weight unsaturated carboxylic acid monomer; and (b) the copolymer has a melt index of 10 to 1000 grams/10 minutes prior to being neutralized.

5. The electrodepositable composition of claim 1 wherein the neutralizing agent and the film build additive are present in an amount that is theoretically capable of neutralizing in the range of from 30 to 150 percent of the carboxylic acid groups of the copolymer comprising α-olefin and unsaturated carboxylic acid.

6. The electrodepositable composition of claim 5 wherein the neutralizing agent is present in an amount in the range of from 1 to 99 percent by weight based on the total weight of the neutralizing agent and film build additive.

7. An electrodepositable aqueous dispersion comprising:
   i) an at least partially neutralized copolymer comprising α-olefin and unsaturated carboxylic acid;
   ii) a film build additive selected from the group consisting of N,N-dimethyldodecylamine, N,N-dimethyloctadecylamine, N,N-didecylmethylamine, N,N-dimethylcyclohexylamine, N,N-dimethylcyclohexylamine, trioctyl amine and a combination thereof; and
   iii) zinc peroxide.

* * * * *